United States Patent
Lee et al.

(10) Patent No.: US 8,873,573 B2
(45) Date of Patent: Oct. 28, 2014

(54) TRANSMISSION SCHEDULING APPARATUS AND METHOD IN WIRELESS MULTI-HOP NETWORK

(75) Inventors: Sangwoo Lee, Daejeon (KR); Han Byeog Cho, Daejeon (KR); Hyun Kyun Choi, Daejeon (KR); Hyun Seo Oh, Daejeon (KR); Sunghwan Moon, Seoul (KR); Minseok Kim, Seoul (KR); Jong-Moon Chung, Seoul (KR); Dong-Sun Lim, Daejeon (KR)

(73) Assignees: Electronics and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 242 days.

(21) Appl. No.: 13/471,421

(22) Filed: May 14, 2012

(65) Prior Publication Data

US 2012/0287913 A1 Nov. 15, 2012

(30) Foreign Application Priority Data

May 13, 2011 (KR) .................. 10-2011-0045340

(51) Int. Cl.
*H04B 7/212* (2006.01)
*H04L 12/43* (2006.01)
*H04W 72/12* (2009.01)
*H04W 84/18* (2009.01)
*H04W 40/20* (2009.01)

(52) U.S. Cl.
CPC .......... *H04W 72/1252* (2013.01); *H04W 84/18* (2013.01); *H04W 40/20* (2013.01)
USPC ...................... 370/444; 370/458; 370/461

(58) Field of Classification Search
CPC ............ H04W 72/1252; H04W 74/04; H04W 74/085; H04W 74/0866; H04W 74/0875
USPC .............. 370/230.1, 294, 321, 442–444, 447, 370/450, 454–455, 458–459, 461
See application file for complete search history.

(56) References Cited

U.S. PATENT DOCUMENTS

| | | | |
|---|---|---|---|
| 7,768,992 B2 | 8/2010 | Pun | |
| 2007/0124419 A1* | 5/2007 | Howorka et al. ............. | 709/217 |
| 2009/0075587 A1 | 3/2009 | Yu et al. | |
| 2009/0129667 A1 | 5/2009 | Ho et al. | |
| 2009/0279496 A1* | 11/2009 | Raissi-Dehkordi et al. .. | 370/329 |
| 2010/0131644 A1 | 5/2010 | Jeong et al. | |
| 2010/0142551 A1* | 6/2010 | Mosko et al. ................. | 370/461 |
| 2010/0226335 A1 | 9/2010 | Sampath et al. | |
| 2010/0268825 A1 | 10/2010 | Jeong et al. | |

FOREIGN PATENT DOCUMENTS

| | | |
|---|---|---|
| KR | 2005-0063415 A | 6/2005 |
| KR | 2009-0029902 A | 3/2009 |
| KR | 2010-0008677 A | 1/2010 |
| KR | 2010-0057367 A | 5/2010 |
| KR | 2010-0114774 A | 10/2010 |
| WO | WO-2008/005994 A1 | 1/2008 |

* cited by examiner

*Primary Examiner* — Redentor Pasia
(74) *Attorney, Agent, or Firm* — Rabin & Berdo, P.C.

(57) ABSTRACT

In a wireless multi-hop network, a transmission scheduling apparatus calculates a transmission demand of every node within the wireless multi-hop network, and allocates a time slot to each node by using the transmission demand of each node.

16 Claims, 18 Drawing Sheets

FIG.5

| NODE | TRANSMISSION DEMAND |
|---|---|
| N1 | 14 |
| N2 | 30 |
| N3 | 33 |
| N4 | 26 |
| N5 | 69 |
| N6 | 34 |
| N7 | 14 |
| N8 | 14 |
| N9 | 45 |
| N10 | 64 |
| N11 | 18 |
| N12 | 25 |
| N13 | 14 |
| N14 | 17 |
| N15 | 27 |

FIG.7

| NODE | ALLOCATED TIME SLOT NUMBER |
|---|---|
| N1 | 2 4 7 15 19 20 24 27 28 30 34 40 46 51 55 57 60 63 66 68 70 73 74 75 77 81 84 104 109 116 123 124 128 132 134 153 158 161 170 173 177 179 180 184 185 205 207 209 215 |
| N2 | 5 33 35 44 45 48 78 87 100 114 139 140 141 154 155 167 171 176 178 192 202 206 |
| N3 | 1 49 53 50 56 65 69 76 92 121 125 129 130 135 138 142 151 159 163 172 175 188 191 212 |
| N4 | 9 16 26 29 41 71 89 110 120 126 131 145 146 157 165 182 200 201 204 |
| N5 | 6 10 17 21 22 39 54 58 62 64 67 82 86 88 91 93 95 96 97 98 101 102 103 105 106 108 111 112 113 115 143 144 147 148 152 156 170 169 181 183 189 190 198 210 213 214 216 217 219 |
| N6 | 3 12 13 14 42 59 61 72 83 94 117 118 122 127 133 137 150 174 186 187 193 194 199 211 |
| N7 | 5 8 11 18 23 25 31 32 36 37 38 43 45 47 48 52 78 79 80 85 87 89 90 107 119 120 136 149 154 162 164 166 167 168 171 196 197 201 203 208 218 |
| N8 | 1 3 12 13 14 42 49 50 53 56 59 61 65 69 72 76 83 92 94 99 117 118 122 125 127 133 135 137 138 150 151 159 172 174 186 187 191 193 194 199 211 212 |
| N9 | 7 15 18 19 24 27 28 30 34 46 47 60 66 70 73 74 79 90 104 116 124 128 132 153 158 161 177 180 184 197 205 209 215 |
| N10 | 2 4 8 11 20 23 25 31 32 36 37 38 40 43 51 52 55 57 63 68 75 77 80 81 85 107 109 119 123 134 136 149 162 164 166 168 170 173 179 185 196 203 207 208 218 |
| N11 | 26 35 44 71 110 114 126 131 141 157 165 176 200 204 |
| N12 | 7 15 16 19 24 27 28 30 33 34 46 60 66 70 73 74 104 116 124 128 132 153 158 161 177 180 184 192 205 209 215 |
| N13 | 5 33 121 129 130 142 163 171 175 188 192 |
| N14 | 1 45 48 49 53 69 78 87 89 120 125 138 139 154 167 201 |
| N15 | 9 29 41 50 56 65 76 92 100 135 140 145 146 151 155 159 172 178 182 191 202 206 212 |

FIG.8A

| TIME SLOT \ NODE | N1 | N2 | N3 | N4 | N5 | N6 | N7 | N8 | N9 | N10 | N11 | N12 | N13 | N14 | N15 |
|---|---|---|---|---|---|---|---|---|---|---|---|---|---|---|---|
| 1 |  |  |  |  | ■ |  |  |  |  |  |  |  |  |  |  |
| 2 |  |  |  |  |  | ■ |  | ■ |  |  |  |  |  |  |  |
| 3 | ■ |  |  |  |  |  |  |  | ■ |  | ■ |  |  |  |  |
| 4 |  |  |  |  |  |  | ■ |  | ■ |  |  |  |  |  |  |
| 5 |  |  |  | ■ |  |  |  |  |  |  |  |  |  |  |  |
| 6 |  |  | ■ |  |  |  |  |  |  |  |  |  | ■ |  |  |
| 7 |  | ■ |  |  |  |  | ■ |  |  |  |  |  |  | ■ |  |
| 8 | ■ |  |  |  |  |  |  | ■ |  | ■ |  |  |  |  | ■ |

■ ALLOCATED TIME SLOT

FIG.8B

HNNGA

| TIME SLOT \ NODE | N1 | N2 | N3 | N4 | N5 | N6 | N7 | N8 | N9 | N10 | N11 | N12 | N13 | N14 | N15 |
|---|---|---|---|---|---|---|---|---|---|---|---|---|---|---|---|
| 1 |  | ■ |  |  |  |  | ■ |  |  |  |  |  | ■ |  |  |
| 2 | ■ |  |  |  |  |  |  | ■ |  |  | ■ |  |  |  |  |
| 3 |  |  |  | ■ |  |  | ■ |  |  |  |  |  |  | ■ |  |
| 4 | ■ |  |  |  |  |  |  |  | ■ |  |  | ■ |  |  |  |
| 5 |  |  | ■ |  |  |  |  | ■ |  |  |  |  |  |  | ■ |
| 6 |  |  |  |  | ■ |  |  |  |  |  |  |  |  |  |  |
| 7 |  |  |  |  |  | ■ |  |  | ■ |  |  |  |  |  |  |
| 8 | ■ |  |  |  |  |  |  |  |  | ■ |  |  |  |  |  |

■ ALLOCATED TIME SLOT

FIG.8C

SVC

| TIME SLOT \ NODE | N1 | N2 | N3 | N4 | N5 | N6 | N7 | N8 | N9 | N10 | N11 | N12 | N13 | N14 | N15 |
|---|---|---|---|---|---|---|---|---|---|---|---|---|---|---|---|
| 1 |  |  |  |  | ■ |  |  |  |  |  |  |  |  |  |  |
| 2 |  |  |  |  |  | ■ |  | ■ |  |  |  |  |  |  |  |
| 3 | ■ |  |  |  |  |  |  |  | ■ |  |  | ■ |  |  |  |
| 4 |  |  |  |  |  |  | ■ |  |  | ■ |  |  |  |  |  |
| 5 |  |  |  | ■ |  |  |  |  |  |  | ■ |  |  |  |  |
| 6 |  |  | ■ |  |  |  |  |  |  |  |  |  | ■ |  |  |
| 7 |  | ■ |  |  |  |  | ■ |  |  |  |  |  |  | ■ |  |
| 8 | ■ |  |  |  |  |  |  | ■ |  |  |  |  |  |  | ■ |

■ ALLOCATED TIME SLOT

FIG.9

|  | E (TRANSMISSION EFFICIENCY) | μ (CHANNEL EFFICIENCY) |
|---|---|---|
| HNNGA | 64.25 | 16.67 % |
| SVC | 60.75 | 15 % |
| Exemplary embodiment (K=10) | 66.91 | 13.67 % |
| Exemplary embodiment (K=1) | 65.52 | 13.6 % |

FIG.15A

| ID OF COORDINATOR NODE | INFORMATION OF SCHEDULING TABLE | ..... | SEQUENCE NUMBER OF COORDINATE NODE ID | SEQUENCE NUMBER OF SCHEDULING TABLE INFORMATION |
| --- | --- | --- | --- | --- |

FIG.15B

| ID OF NODE | INTER-NODE CONNECTION INFORMATION AND LOCATION INFORMATION | ..... | SEQUENCE NUMBER OF NODE ID | SEQUENCE NUMBER OF CONNECTION INFORMATION AND LOCATION INFORMATION | ns # TRANSMISSION SCHEDULING APPARATUS AND METHOD IN WIRELESS MULTI-HOP NETWORK

CROSS-REFERENCE TO RELATED APPLICATION

This application claims priority to and the benefit of Korean Patent Application No. 10-2011-0045340 filed in the Korean Intellectual Property Office on May 13, 2011, the entire contents of which are incorporated herein by reference.

BACKGROUND OF THE INVENTION (a) Field of the Invention

The present invention relates to a transmission scheduling apparatus and method in a wireless multi-hop network and, more particularly, to a transmission scheduling apparatus and method based on time division multiplex access in a wireless multi-hop network.

(b) Description of the Related Art

An ad-hoc network, a type of a wireless multi-hop network, has been proposed for packet communication sharing a single radio channel. The ad-hoc network can provide a flexible communication service to geographically distributed nodes by using a radio channel as a medium of broadcasting.

The ad-hock network includes multi-hop nodes, and the respective nodes have connectivity with neighboring nodes within communication coverage by sharing a radio channel, thus being able to perform direct communication. Each node may store a packet received from a node and transfer and relay the packet to a different node.

In this manner, since the nodes in the ad-hoc network share a single radio channel through a multi-access scheme, uncontrolled packet transmission may cause a packet collision to damage packets and interfere with packet transmission, resultantly having a negative influence on a transfer rate of the overall network. Thus, all the nodes in the ad hoc network are to be allocated a transmission opportunity based on appropriate time division to avoid collision of packets.

In order to prevent collision of packets, a time division multiple access (TDMA) scheme is used for allocating a transmission opportunity of each node. A TDMA-based ad hock network defines a time axis by a frame having a certain length. In the TDMA-based ad hoc network, broadcasting scheduling is performed such that every node is allocated one or more transmission opportunities from a scheduling table including a certain number of frames, and two mobile nodes located at a one-hop or two-hop distance may not be allocated a transmission opportunity simultaneously.

In relation to an optimized broadcast scheduling algorithm (BSA), research has been actively ongoing since the mid-1980s. Meanwhile, non-deterministic polynomial-time (NP) complete of a broadcast scheduling problem (BSP) was verified in an optimization scheduling process through a distributed greedy algorithm, and a scheduling method including two steps through a mean field annealing (MFA) algorithm has been proposed.

The MFA algorithm is a scheduling method of deriving a minimum number of frames implementable through a node having a maximum number of neighbor nodes, and allowing a maximum number of nodes to be allocated a transmission opportunity in a next stage.

Following the MFA algorithm, sequential vertex coloring (SVC), a Hopfield neural network genetic algorithm (HNNGA), and the like have been used as the BSA.

In the related art BSA, performance of a scheduling table is evaluated on the basis of the Pollaczek-Khintchine formula, and here, the performance of a scheduling table on the basis of the Pollaczek-Khintchine formula refers to a mathematically calculated average packet transmission delay time.

In terms of the characteristics of the Pollaczek-Khintchine formula, the related art BSA makes completion of a scheduling table having a shortest frame length by applying the same packet arrival rate to every node, as a first condition of optimized scheduling, and makes maximization of channel utilization allowing a maximum number of nodes to be allocated a time slot after the shortest frame length is determined, as a second condition.

In this manner, the related art BSA presupposes that every node existing in a network has identical packet transfer quantity without consideration of location and connection information of the nodes. However, in an actual ad-hoc network, network topology is frequently changed due to mobility of nodes, and since communication is performed between nodes through a multi-hop relay, a phenomenon in which packets are concentrated to a node located at the center of the network or a node having a greater number of neighbor nodes occurs frequently. A bottleneck phenomenon resulting from such a phenomenon degrades the packet transfer rate of the overall network.

SUMMARY OF THE INVENTION

The present invention has been made in an effort to provide a transmission scheduling apparatus and method having advantages of enhancing packet transfer quantity of an overall wireless multi-hop network in the network.

An exemplary embodiment of the present invention provides a transmission scheduling method for scheduling a plurality of nodes by a transmission scheduling apparatus in a wireless multi-hop network. The transmission scheduling method may include calculating a transmission demand of each of the plurality of nodes, and allocating at least one time slot to the plurality of nodes by using the transmission demand of each of the plurality of nodes.

The calculating may include receiving location information and information regarding connections with neighbor nodes from each of the plurality of nodes, and calculating a transmission demand of each node by using the location information of each node and the information regarding connections with neighbor nodes of each node.

The allocating may include allocating time slots starting from a node having the highest transmission demand among the plurality of nodes.

The allocating of time slots starting from the node having the highest transmission demand may include allocating the corresponding time slot to a node which does not have a collision with the time slot-allocated node.

The allocating may include: allocating one time slot to the node having a maximum transmission demand among the candidate nodes to which the one time slot is to be allocated; excluding a node to which the one time slot has been allocated and a node which has a collision with the time slot-allocated node; and when there is a node to which the one time slot is to be additionally allocated among the candidate nodes, allocating the one time slot to the corresponding node.

The allocating may further include, when there are no more nodes to which the one time slot is to be additionally allocated among the candidate nodes, readjusting the transmission demands of the nodes which have been allocated the one time slot.

The allocating may further include when there are no more nodes to which the one time slot is to be additionally allocated among the candidate nodes, switching to another time slot and allocating the another time slot to at least one node based on the transmission demands of the plurality of nodes.

The transmission scheduling method may further include converting the transmission demands of the plurality of nodes into a number of guaranteed time slots which are to be guaranteed for each of the plurality of nodes at the minimum.

The transmission scheduling method may further include shuffling the time slots by time slot unit.

Another embodiment of the present invention provides a transmission scheduling apparatus of scheduling a plurality of nodes in a wireless multi-hop network. The transmission scheduling apparatus may include a transmission demand calculation unit and a time slot allocation unit. The transmission demand calculation unit may calculate the number of guaranteed time slots to be guaranteed at the minimum for each of the plurality of nodes corresponding to each of the transmission demands of the plurality of nodes in the wireless multi-hop network. The time slot allocation unit allocates at least one time slot to each node based on the number of guaranteed time slots of the plurality of nodes.

The transmission scheduling apparatus may further include a management unit receiving location information and information regarding connections with neighbor nodes from the plurality of nodes and managing the same, wherein the transmission demand calculation unit may calculate the location information and the information regarding the connections with neighbor nodes received from each of the plurality of nodes.

The time slot allocation unit may allocate the corresponding time slot starting from a node having the highest transmission demand among candidate nodes to which the corresponding time slot is to be allocated, by one time slot each time, and may not allocate the identical time slot to a node which has a collision with a node to which the corresponding time slot has been allocated among the candidate nodes.

The time slot allocation unit may additionally allocate a time slot to a node which does not has a collision with a node which has been allocated a time slot.

When the number of time slots allocated to the plurality of nodes satisfies the number of guaranteed time slots of the plurality of nodes, the time slot allocation unit may shuffle the time slots by time slot unit.

BRIEF DESCRIPTION OF THE DRAWINGS

FIG. 5 is a view showing an example of transmission demands of respective nodes in the wireless multi-hop network according to an embodiment of the present invention.

FIG. 7 is a view showing an example of a scheduling table performing scheduling according to a transmission scheduling method according to an embodiment of the present invention.

FIGS. 8A to 8C are views showing scheduling tables according to the related art MFA, HNNGA, and SVC with respect to the wireless multi-hop network of FIG. 1, respectively.

FIG. 9 is a view showing a comparison between transmission efficiency of the transmission scheduling method according to an embodiment of the present invention and that of the related art transmission scheduling method.

FIGS. 15A and 15B show formats of messages transmitted and received between the transmission scheduling apparatus and a node according to an embodiment of the present invention.

DETAILED DESCRIPTION OF THE EMBODIMENTS

Figure 1:
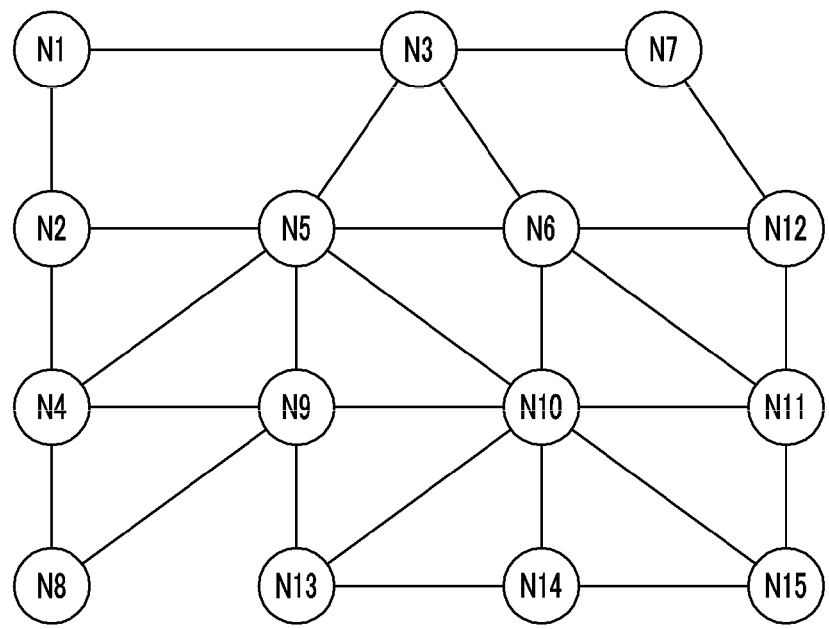
FIG. 1 is a flowchart illustrating a wireless multi-hop network according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A transmission scheduling apparatus and method in a wireless multi-hop network according to embodiments of the present invention will be described in detail with reference to the accompanying drawings.

Figure 2:
FIG. 2 is a view showing an example of direct collision.
Figure 3:
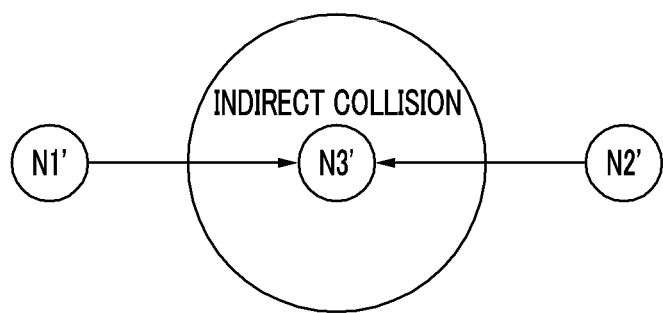
FIG. 3 is a view showing an example of indirect collision

FIG. 1 is a flowchart illustrating a wireless multi-hop network according to an embodiment of the present invention. FIG. 2 is a view showing an example of direct collision, and FIG. 3 is a view showing an example of indirect collision With reference to FIG. 1, the wireless multi-hop network includes a plurality of nodes N1 to N15 communicating with each other based on multi-hop relaying.

Each of the nodes N1 to N15 has connection information of a routing path with respect to every other connectable node.

Also, each of the nodes N1 to N15 shares a single channel through a multi-access scheme, thus performing communication with a neighbor node. Thus, a packet collision may occur. The packet collision may include a direct collision and an indirect collision.

FIG. 2 is a view showing an example of the direct collision. The direct collision refers to a collision made as two nodes N1' and N2', which can directly transmit and receive packets to and from each other, are simultaneously allocated a transmission opportunity. This collision takes place since it is against a basic presupposition that a single node cannot simultaneously perform transmission and reception.

FIG. 3 is a view showing an example of the indirect collision. The indirect collision occurs when two nodes N1' and N2' sharing a common node N3' as a neighbor node are simultaneously allocated a transmission opportunity. This collision takes place since it is against a basic presupposition that a certain node cannot simultaneously receive two or more packets.

In order to prevent a packet collision of nodes, a transmission scheduling apparatus of a wireless multi-hop network according to an embodiment of the present invention performs transmission scheduling based on a time division multiple access (TDMA) scheme, thus guaranteeing transmission without a collision in a network unit.

In the TDMA scheme, a time axis is defined by a frame having a certain length, and at least one frame may include at least one time slot.

The transmission scheduling apparatus allocates one or more transmission opportunities to each node from a scheduling table included of a certain number of frames. In this transmission scheduling, if nodes within a two-hop distance perform a transmission at the same time, such a collision as shown in FIG. 2 or FIG. 3 is likely to occur, so the transmission scheduling apparatus does not simultaneously allocate a transmission opportunity to two nodes located within a one-hop distance or two-hop distance. The scheduling table shows transmission scheduling with respect to a packet transmission of each node.

Referring back to the wireless multi-hop network illustrated in FIG. 1, the node N1 and the node N8 have a smaller number of adjacent nodes and, since the node N1 and the node N8 are located at the edges of the overall network, they participate less in multi-hop packet relaying. Meanwhile, a node like the node N10 having a large number of adjacent nodes and located at the center of the network, more frequently participates in the multi-hop packet relaying, so it is supposed to process a relatively large amount of packets. In this case, when scheduling is performed without consideration of a difference between the packet transfer quantities of respective nodes as in the related art BSA, a packet overload may occur in a particular node. Thus, the transmission scheduling apparatus of the wireless multi-hop network according to an embodiment of the present invention places the focus on reducing a bottleneck phenomenon occurring as packets are concentrated to a particular node and performs transmission scheduling on the nodes in the wireless multi-hop network on the basis of time-division.

Namely, the transmission scheduling apparatus of the wireless multi-hop network, putting maximization of transmission efficiency first, completes a scheduling table with respect to the nodes in the multi-hop network. Here, transmission efficiency may be defined as the sum of transmission demands of the nodes which have been allocated a transmission opportunity from the completed scheduling table.

In order to enhance transmission efficiency, the transmission scheduling apparatus may perform transmission scheduling on the respective nodes such that as the sum of transmission demands is increased, a single time slot is preferentially allocated to a node that requires more transmission opportunities on average.

The transmission scheduling apparatus may be an external device of the wireless multi-hop network, or may be a coordinator node that handles control of the overall network among the plurality of nodes N1 to N15 in the wireless multi-hop network.

The transmission scheduling apparatus and method in the wireless multi-hop network according to embodiments of the present invention will be described in detail as follows.

Figure 4:
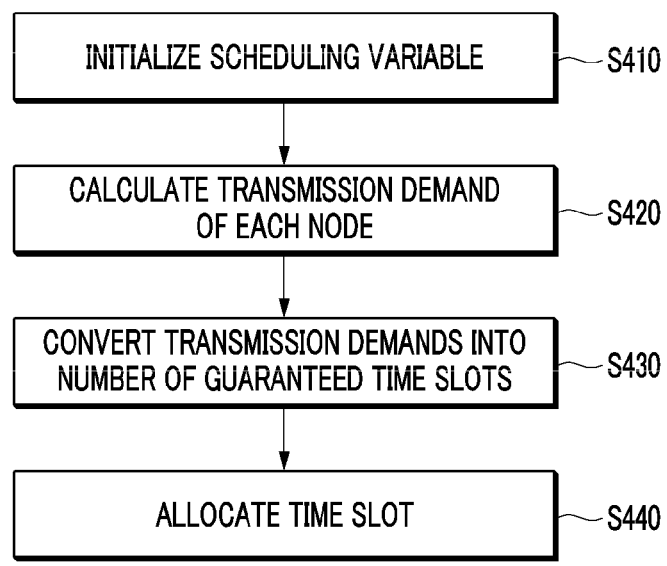
FIG. 4 is a flowchart illustrating a process of a method of scheduling transmission in a wireless multi-hop network according to an embodiment of the present invention.

FIG. 4 is a flowchart illustrating a process of a transmission scheduling method in a wireless multi-hop network according to an embodiment of the present invention, and FIG. 5 is a view showing an example of transmission demands of respective nodes in the wireless multi-hop network according to an embodiment of the present invention.

With reference to FIG. 4, the transmission scheduling device in the wireless multi-hop network initializes scheduling variables [T, $\Theta$, $\alpha$, s(t, i)] required for transmission scheduling with respect to nodes in the wireless multi-hop network (S410). Here, T is transmission demands of the nodes, and s(t, i) is a scheduling table. When a time slot is allocated to a node i at time t, s(t, i)=1, or otherwise, s(t, i)=0. $\Theta$ and $\alpha$ will be described in detail later.

The transmission scheduling apparatus calculates transmission demands of all the nodes in the wireless multi-hop network (S420). The transmission scheduling apparatus may calculate a routing path according to a routing method determined in the wireless multi-hop network, and calculate a quantized transmission demand with respect to each of the nodes by using connection information and relay information of the routing path and location information of each node.

The transmission demands may be calculated on the assumption that every node transmits a packet at least one time to every other node, excluding itself, and if a routing path of a packet is determined through a routing technique such as Bellman-Ford, or the like, when the number of the nodes constituting the wireless multi-hop network is N, information regarding how many times packet transmissions corresponding to (N*N−1) number of times pass through nodes, and in this case, information regarding which nodes the packet transmissions pass through may be collected. The transmission demand refers to the sum of a number of transmissions of packets generated in a corresponding node and a number of transmissions of packets participating in relaying of packets generated from a different node.

In the case of the wireless multi-hop network as shown in FIG. 1, transmission demands of the respective nodes may be obtained as shown in FIG. 5. Namely, the node N1 and the node N8 do not participate in packet relaying of a different node, and the node N5 and the node N10 require transmission opportunities four-fold or more, in comparison to the node N1.

Meanwhile, the transmission scheduling apparatus may individually set a transmission demand to satisfy requirements of performance of each node as necessary, rather than being dependent on a particular routing method.

Meanwhile, when the number of nodes in the wireless multi-hop network is N, the maximally calculated transmission demands may be N*(N−1). Namely, as the number or nodes belonging to the wireless multi-hop network is increased, the transmission demands are increased by geometrical progression.

When a scheduling table guaranteeing the time slots by the transmission demands calculated as described above is desired to be completed, the length of frames of the scheduling table id is dependent on the number of nodes. However, an excessively extended length of frames may act as a factor that delays time for adaptation when connection information of the network is changed, so it is required to maintain a stable frame length to the utmost. Thus, the transmission scheduling apparatus adds a scaling factor to the transmission demands to convert the transmission demands into the number of guaranteed time slots (S430). The number of guaranteed time slots may be calculated as shown in Equation 1 below.

$$\tilde{T}_i = \left\lceil \frac{KT_i}{\min_{\forall x}(T_x)} \right\rceil \quad \text{[Equation 1]}$$

In Equation 1, $\tilde{T}$ is the number of guaranteed time slots, and $T_i$ is transmission demand of a node i. K is a scaling factor. K is set may be set such that $T_i$ values of the remaining nodes are divided by a $T_i$ value of a node having a minimum value, among the $T_i$ values of the respective nodes, and the number of time slots that may be guaranteed for a node having a minimum $T_i$ value is determined. When K is set to be 1, a node having a minimum $\tilde{T}$ value in the scheduling table may be set to be allotted one or more time slots. Finally, the $\tilde{T}$ values of all the nodes as calculated above are rounded to integer values to thus determine the number of guaranteed time slots. The thusly calculated number of guaranteed time slots refers to a number of time slots that should be guaranteed for each node at the minimum in the scheduling table.

Through the foregoing process, a scheduling table having a considerably stable length can be completed.

In this manner, since each node is allocated time slots by the number of minimum guaranteed time slots in the scheduling table, the frame length of the scheduling table according to an embodiment of the present invention is extended in comparison to that of the related art BSA. The frames of the scheduling table completed in the network having various network connection densities have the tendency that, when the connectivity density of the network is low, the distributions of frame lengths are large, but as the connectivity density of the network is gradually increased, it is converged to a stable length. Thus, although the connectivity density of the network is increased, the frame length is stable.

Next, the transmission scheduling apparatus allocates time slots to the nodes based on the number of guaranteed time slots, i.e., the $\tilde{T}$ value, which should be guaranteed for each node, to provide a transmission opportunity (S440). In this manner, the scheduling table is completed.

Figure 6:
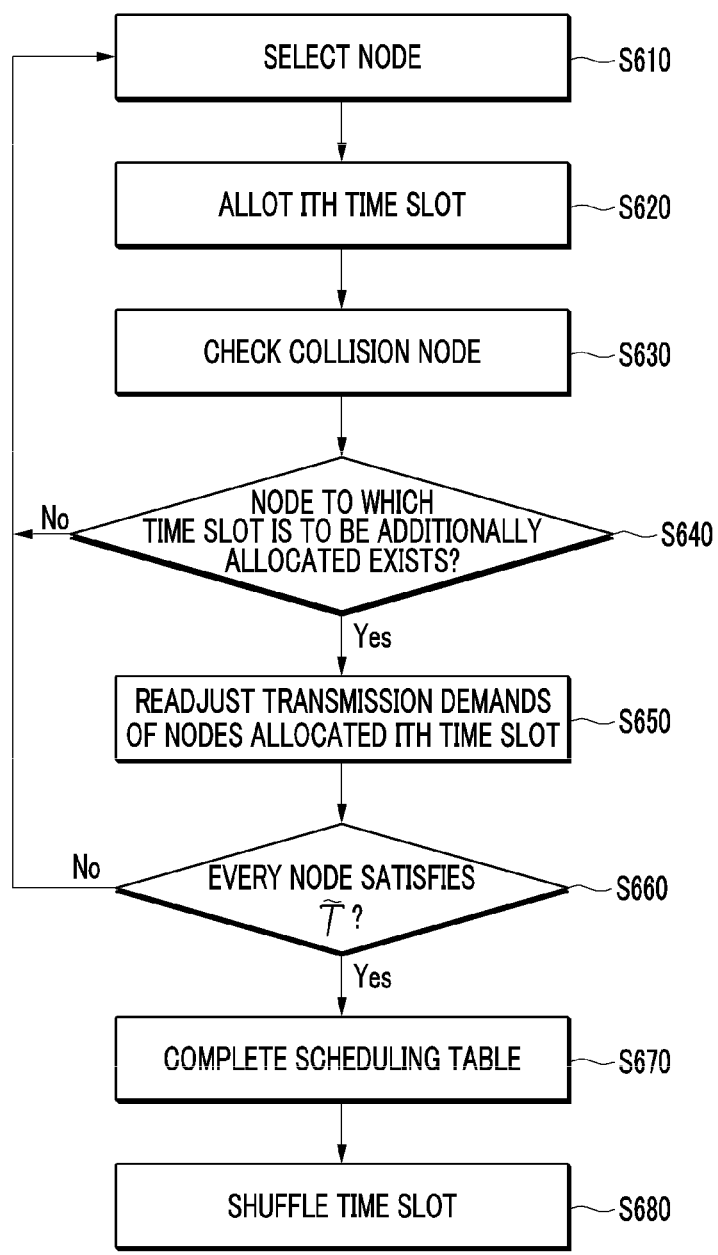
FIG. 6 is a flowchart illustrating a process of a method of allocating a time slot to a node according to an embodiment of the present invention.

FIG. 6 is a flowchart illustrating a process of a method of allocating a time slot to a node according to an embodiment of the present invention.

A single frame includes a plurality of time slots, and a method of allocating a time slot to each of ith nodes will be described for the sake of explanation hereinafter.

With reference to FIG. 6, the transmission scheduling apparatus selects a node having a maximum transmission demand, namely, a maximum $\tilde{T}$ value, among the nodes not included in an aggregate Θ (S610), and allocates the ith time slot to the selected node to provide a transmission opportunity in the corresponding time slot (S620). The aggregate Θ is a list of nodes that may have a direct or indirect collision, and includes the node allocated the ith time slot and a node that has a collision with the node allocated the ith time slot. For example, in a case in which a first time slot is allocated to the node N1 in a first time slot, allocation of an identical time slot to all the nodes within two hops from the node N1 would cause a collision, so the node N1 and all the nodes within the two hops from the node N1 are included in the set Θ to exclude them from the candidate nodes to which the first time slot is to be allocated.

Namely, among the plurality of nodes, the transmission scheduling apparatus allocates the time slot starting from the node having the maximum $\tilde{T}$ value among the nodes excluding the node which was allocated the ith time slot and the node which makes a collision with the node allocated the ith time slot.

The transmission scheduling apparatus adds the nodes to which the time slot was allocated to the aggregate Θ, checks nodes which have a collision with the nodes added to the aggregate Θ after being allocated the time slot, namely, all the nodes located within one hop or two hops from the nodes added to the aggregate Θ after being allocated the time slot, and adds the same to the aggregate Θ (S630). Then, the ith time slot is not allocated to the nodes added to the aggregate Θ in step S610, so an occurrence of a direct or indirect collision as mentioned above in step S630 can be prevented.

Next, the transmission scheduling apparatus determines whether or not there is a node to which the ith time slot is to be additionally allocated (S640), and repeatedly performs steps S610 to S640 to allocate the ith time slot to the corresponding nodes until there are no more nodes to which the ith time slot is to be allocated. When there are no more nodes that cause a collision with the nodes already allocated the ith time slot among the nodes excluding the nodes allocated the ith time slot, the transmission scheduling apparatus determines that there are no more nodes to which the ith time slot is to be additionally allocated.

When the transmission scheduling apparatus determines that there are no more nodes to which the ith time slot is to be additionally added (S640), the transmission scheduling apparatus readjusts the transmission demands of the nodes which have been allocated the ith time slot (S650). As for the readjustment of the transmission demands of the nodes which have been allocated the ith time slot, the transmission demands of the nodes which have been allocated the ith time slot after the step S620 may be individually readjusted.

Readjusting the transmission demands resultantly refers to readjusting the $\tilde{T}$ value. In this case, since the time slot has already been allocated to the nodes in step S620, the transmission demands may be readjusted as expressed by Equation 2 below in a process of updating by subtracting the transmission demands.

$$T_\psi = \begin{cases} T_\psi - 1 & \text{if } 2 \le T_\psi \\ (T_\psi^o - 1)/T_{max} & \text{if } 1 = T_\psi \\ T_\psi - \alpha T_{max}^{-1} & \text{else if } 0.1 \le T_\psi < 1 \\ 0 & \text{else} \end{cases} \quad \text{[Equation 2]}$$

In Equation 2, $T_\psi$ is a transmission demand of a node ψ, and $T_{max}$ is a maximum value among initial transmission demands. Also, in Equation 2, it is assumed that, after all the transmission demands are satisfied, a variable used to perform allocation to remaining slots is 1, but, any other values may also be used.

Also, in Equation 2, α is a variable for adjusting density of transmission scheduling, which may be set to be, for example, NK/2. N is the number of nodes, and K is a scaling factor. As the value α is increased, transmission scheduling is performed in depth, and as the value α exceeds a particular value according to a state of the wireless multi-hop network such as the number of nodes and links, or the like, it becomes stable without affecting the transmission scheduling. The value α may be set to be a value greater than the particular value. Then, the transmission scheduling may be performed in-depth.

After readjusting the transmission demands of the nodes allocated the ith time slot, the transmission scheduling apparatus determines whether or not the value $\tilde{T}$ of all the nodes is satisfied (S660). In the readjusting of the transmission demands, the subtraction operation is performed on the transmission demands of the nodes allocated the ith time slot. Thus, if a node whose transmission demand is greater than 1 exists, the transmission scheduling apparatus may determine that the value $\tilde{T}$ of all the nodes is not satisfied yet.

When the value $\tilde{T}$ of all the nodes is not satisfied yet, the transmission scheduling apparatus switches to a next time slot, and repeatedly performs the steps S610 to S650 to allocate the next time slot to the corresponding nodes. In this manner, when switching to the next time slot, the aggregate $\Theta$, which was used in the first time slot, is initialized.

After the steps are repeatedly performed, when the value $\tilde{T}$ of all the nodes is satisfied, a scheduling table in which transmission schedules of the respective nodes are shown is completed (S670).

Next, the transmission scheduling apparatus shuffles the time slots by time slot unit with respect to the scheduling table so that the dispositions of the time slots have an equal distribution overall (S680). Through this process, all the nodes can be guaranteed for transmission opportunities equal to or greater than the number of time slots.

Referring to the transmission demands of the respective nodes illustrated in FIG. 5, a case in which transmission nodes of some particular nodes are especially high occurs frequently. In such a case, there is a high possibility of completing a scheduling table in which time slots which have allocated a transmission opportunity to a particular node are continued. Such a phenomenon may act as a factor for interfering with exhibition of optimized performance in a network at which a packet arrives by a certain probability. The shuffling of the respective time slots according to an embodiment of the present invention obtains an effect that an equal transmission opportunity can be provided to all the nodes even within a certain short period of the entire frames, as well as the entire scheduling table, thus improving network performance.

FIG. 7 is a view showing an example of a scheduling table performing scheduling according to a transmission scheduling method according to an embodiment of the present invention.

FIG. 7 is a view showing a scheduling table completed after performing transmission scheduling methods of FIGS. 4 and 6 by using the requested transfer quantity of each node illustrated in FIG. 5.

FIGS. 8A to 8C are views showing scheduling tables according to the related art MFA, HNNGA, and SVC with respect to the wireless multi-hop network of FIG. 1, respectively, and FIG. 9 is a view showing a comparison between transmission efficiency of the transmission scheduling method according to an embodiment of the present invention and that of the related art transmission scheduling method.

With reference to FIGS. 8A to 8C and FIG. 9, scheduling tables having 8 time slots are completed for MFA or HNNGA and SVC, and some 16% of channel efficiency on average is obtained.

Meanwhile, it can be seen that the scheduling table according to the transmission scheduling method according to an embodiment of the present invention has high efficiency in comparison to the existing BSA.

Also, the scheduling table according to the transmission scheduling method according to an embodiment of the present invention has an extended frame length and relatively low channel efficiency in comparison to the scheduling tables generated in HNNGA and SVC. When the performance evaluation reference used in the related art BSA is applied, it may be determined that the transmission scheduling method according to an embodiment of the present invention is inferior to the related art BSA in terms of the average packet transmission delay time performance.

Figure 10:
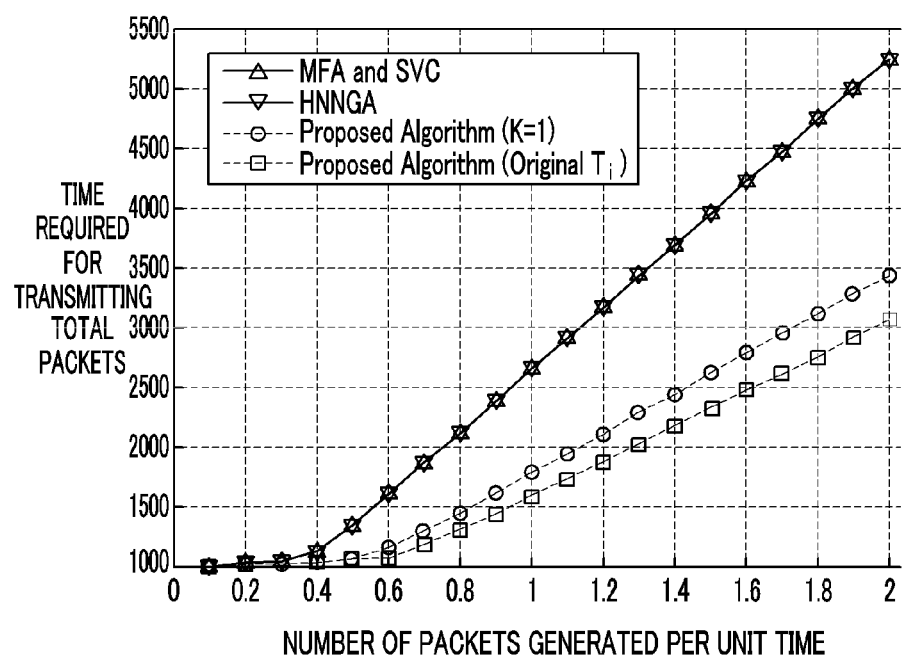
FIG. 10 is a view showing time required for transmitting a packet according to an embodiment of the present invention and that of the related art BSA.

However, as shown in FIG. 10, the results obtained by carrying out a simulation such that a certain packet was actually generated to perform a multi-hop relay transmission show that the number of time slots required for completely transmitting all the packets according to the transmission scheduling method according to an embodiment of the present invention is overwhelmingly superior.

Figure 11:
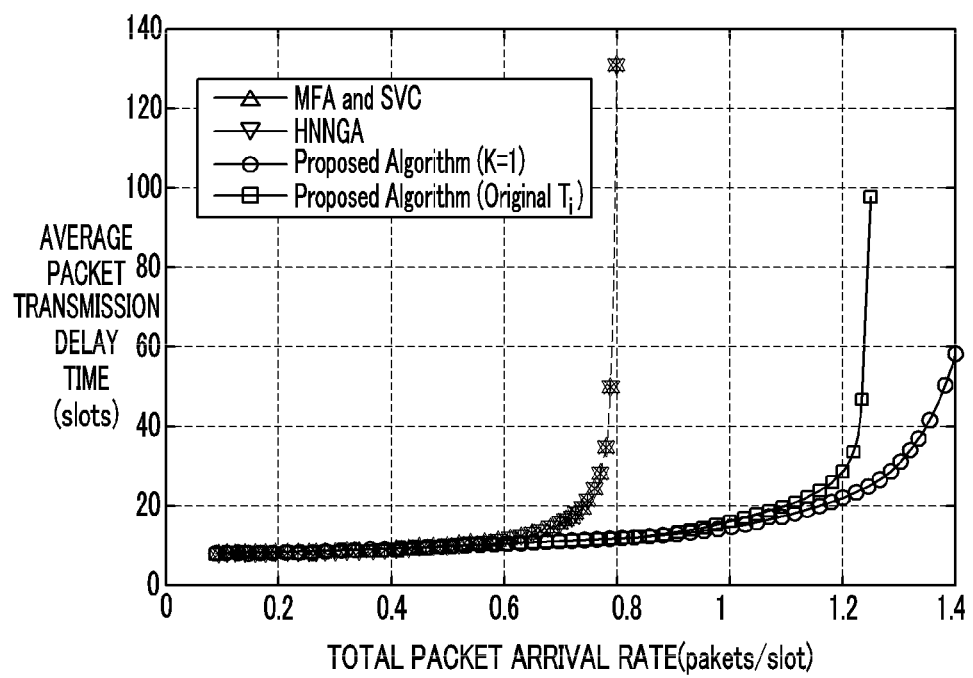
FIG. 11 is a view showing a packet transmission delay time according to differentiated packet arrival rates of respective nodes.

FIG. 10 is a view showing time required for transmitting a packet according to an embodiment of the present invention and that of the related art BSA, and FIG. 11 is a view showing a packet transmission delay time according to differentiated packet arrival rates of respective nodes.

Figure 12:
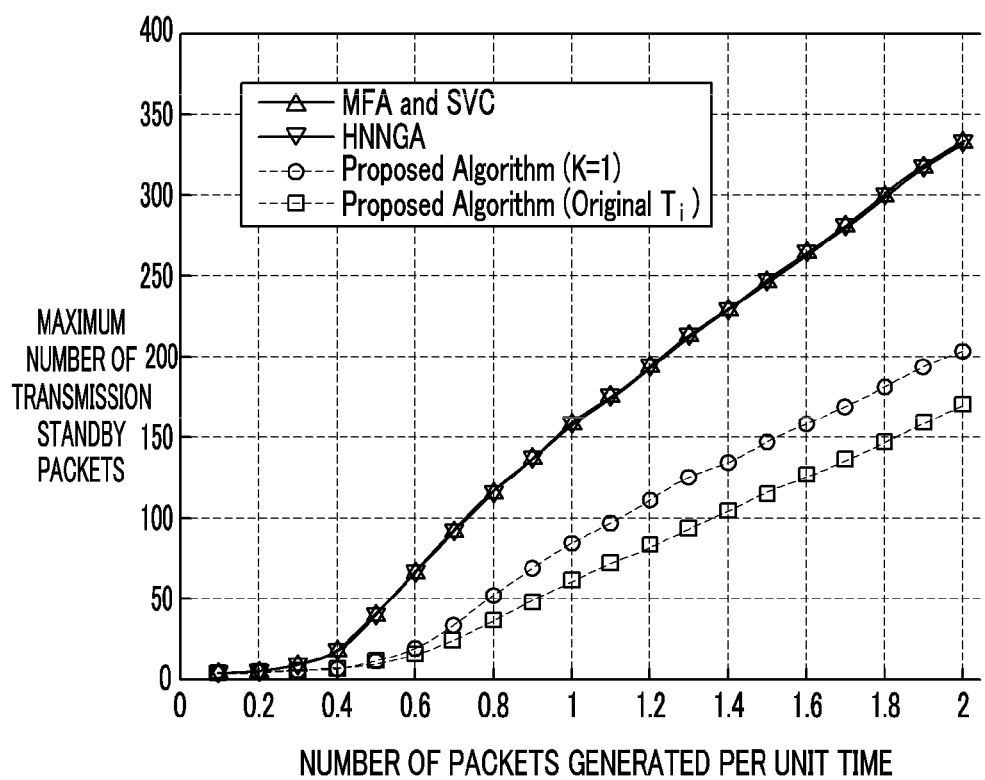
FIG. 12 shows curves of a maximum number of transmission standby packets in transmission packet scheduling according to an embodiment of the present invention and that of the related art BSA.

In FIGS. 11 and 12, "Proposed Algorithm K=1" indicates the results of transmission scheduling with respect to the number of guaranteed time slots obtained by setting the scaling factor (K) in Equation 1 as 1 according to an embodiment of the present invention, and "Proposed Algorithm (Original $T_i$)" indicates the results of transmission scheduling with respect to the number of guaranteed time slots obtained by taking only the original transmission demands into consideration, namely, by setting K=min(Tx) in Equation 1.

FIG. 11 shows a packet transmission delay time according to each packet arrival rate when differentiated packet arrival rates are applied to the Pollaczek-Khintchine formula introduced by the related art BSA.

With reference to FIG. 11, it can be seen that the transmission scheduling method according to an embodiment of the present invention can process a larger amount of packets than that of the related art BSA and post a lesser increase in the packet transmission delay time.

Also, the transmission scheduling method according to an embodiment of the present invention obtains an effect of reducing the number of transmission standby packets. When the nodes in the network receive a new packet in a state of having a packet to be transmitted, the nodes store the received new packet and perform transmission in time order, namely, according to the first-in first-out scheme. Thus, if a phenomenon in which an excessive number of packets are accumulated in a standby queue due to a bottleneck phenomenon or the like occurs, the packets are lost due to the shortage of a storage space, which greatly affects degradation of the overall performance of the network.

FIG. 12 shows curves of a maximum number of transmission standby packets in transmission packet scheduling according to an embodiment of the present invention and that of the related art BSA. It can be confirmed that the results obtained by performing the transmission scheduling method according to an embodiment of the present invention are excellent.

Namely, the transmission scheduling method according to an embodiment of the present invention improves the overall performance of the network by reducing the maximum number of standby packets. Here, the maximum number of transmission standby packets is a numerical value indicating a maximum value among the packet queue accumulated during a simulation by applying the identical packet generation pattern to the existing BSA and the transmission scheduling method according to an embodiment of the present invention.

Figure 13:
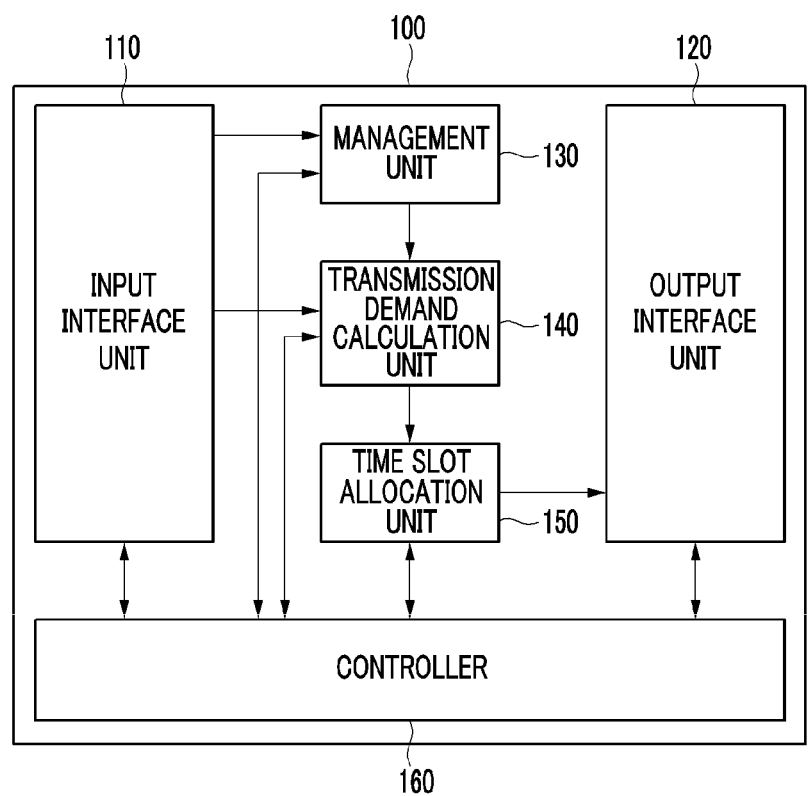
FIG. 13 is a block diagram of a transmission scheduling apparatus according to an embodiment of the present invention.

FIG. 13 is a block diagram of a transmission scheduling apparatus according to an embodiment of the present invention.

With reference to FIG. 13, a transmission scheduling apparatus 100 includes an input interface 110, an output interface 120, a management unit 130, a transmission demand calculation unit 140, a time slot allocation unit 150, and a controller 160.

The input interface unit 110 receives locations, network connection information, and relay information from nodes in a wireless multi-hop network, and transfers the same to the management unit 130.

The output interface unit 120 transmits information of a scheduling table in the wireless multi-hop network to nodes of the wireless multi-hop network.

The management unit 130 manages the locations, connection information, and relay information of the respective nodes in the wireless multi-hop network.

The transmission demand calculation unit 140 calculates a transmission demand of each node by using the locations, connection information, and relay information of the respective nodes in the wireless multi-hop network. Also, the transmission demand calculation unit 140 may convert the transmission demand of each node into the number of guaranteed time slots.

The time slot allocation unit 150 allocates a time slot to the nodes by using the transmission demand of each node on the basis of FIGS. 4 and 6.

In detail, on the basis of the transmission demands of the respective nodes, the time slot allocation unit 150 preferentially allocates a corresponding time slot to a node having the highest transmission demand, among nodes excluding a node which was already allocated a time slot in the corresponding time slots and a node causing a collision with the time slot-allocated node. Next, the time slot allocation unit 150 checks nodes that have a collision with the node to which the time slot was allocated in the corresponding time slot, so that the checked nodes are not allotted a transmission opportunity in the identical time slot.

Next, the time slot allocation unit 150 checks whether or not there is a node to which the corresponding time slot is to be additionally allocated, selects a node to be allocated a time slot in the same manner as described above, and allocates the corresponding time slot. The time slot allocation unit 150 allocates the corresponding time slot by repeatedly performing the method as described above until there are no more nodes to which the corresponding time slot is to be additionally allocated. When there are no more nodes to which the corresponding time slot is to be additionally allocated, the time slot allocation unit 150 readjusts the transmission demands of the nodes to which the corresponding time slot is to be allocated, switches to a next time slot, and then allocates the next time slot to each node. The time slot allocation unit 150 repeatedly performs the foregoing process until all the nodes satisfy the number of guaranteed time slots, thus completing a scheduling table. The time slot allocation unit 150 shuffles the completed scheduling table by time slot unit.

The controller 160 controls operations of the input interface unit 110, the output interface unit 120, the management unit 130, the transmission demand calculation unit 140, and the time slot allocation unit 150.

Figure 14:
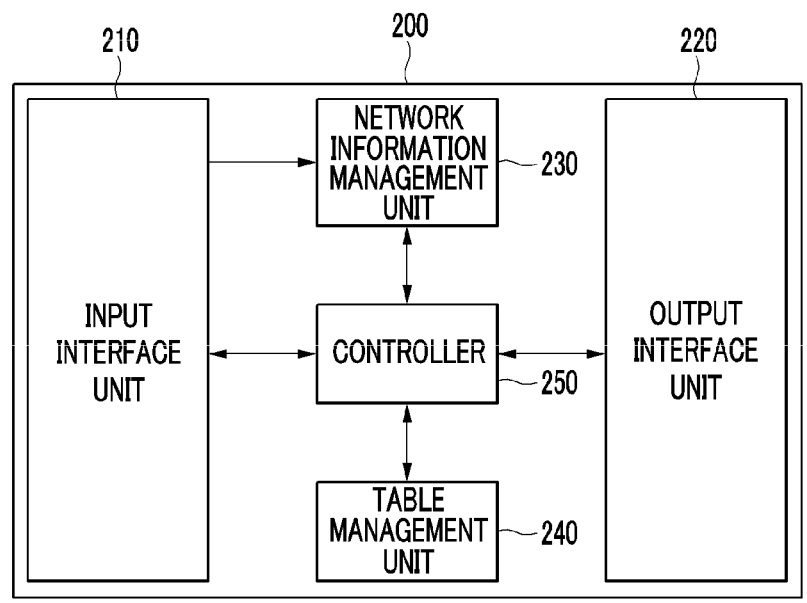
FIG. 14 is a view schematically showing a node in a wireless multi-hop network according to an embodiment of the present invention.

FIG. 14 is a view schematically showing a node in a wireless multi-hop network according to an embodiment of the present invention.

With reference to FIG. 14, each of nodes 200 in the wireless multi-hop network includes an input interface unit 210, an output interface unit 220, a network information management unit 230, a table management unit 240, and a controller 250.

The input interlace unit 210 handles inputting in a corresponding node. Namely, the input interface unit 210 may receive a packet and receive information regarding the scheduling table from the transmission scheduling apparatus.

The output interface unit 220 handles outputting in the corresponding node. Namely, the output interface unit 220 may transmit a packet according to scheduling controlled by the controller 250, and transmit information regarding current connections of neighbor nodes and relay information to the transmission scheduling apparatus.

The network information management unit 230 manages the information regarding the current connections of the neighbor nodes and relay information, and transfers the information regarding the current connections of the neighbor nodes and relay information to the transmission scheduling apparatus through the output interface unit 220.

The table management unit 240 manages information of the scheduling table received from the transmission scheduling apparatus, and performs connection to a channel at a time allocated through the information of the scheduling table.

The controller 250 controls the operations of the input interface unit 210, the output interface unit 220, the network information management unit 230, and the table management unit 240.

FIGS. 15A and 15B show formats of messages transmitted and received between the transmission scheduling apparatus and a node according to an embodiment of the present invention.

FIG. 15A shows a message format for transmitting information of the scheduling table to the nodes of the wireless multi-hop network by the transmission scheduling apparatus. The message may include an identifier (ID) of the transmission scheduling apparatus, namely, a coordinator node, information of the scheduling table, a sequence number of coordinator node ID, and a sequence number of the scheduling table.

Also, FIG. 15B shows a message format for transmitting network information to the transmission scheduling apparatus by a node of the wireless multi-hop network. The message may include an identifier (ID) of the node transmitting corresponding information, inter-node connection information (or information regarding connections between nodes) and location information, a sequence number of the node identifier transmitting the corresponding information, and a sequence number of connection information and link information.

In this manner, the transmission scheduling apparatus receives the inter-node connection information (i.e., information regarding connections between respective nodes) and location information from the nodes of the wireless multi-hop network, calculates a transmission demand of each node on the basis of the received information, performs transmission scheduling by using the calculated transmission demands of the respective nodes, and then transmits the results, namely, the information of the scheduling table, to each node.

According to an embodiment of the present invention, since a transmission demand of each node in the wireless multi-hop network is calculated and a differentiated time slot in the scheduling time slot is allocated according to the transmission demand of each node, an occurrence of a phenomenon in which packets are overloaded to a particular node can be prevented, and thus a packet transfer rate of the overall network can be enhanced.

Also, since the number of transmission standby packets of each node is reduced, the overall performance of the network can be enhanced.

The embodiments of the present invention may not necessarily be implemented only through the foregoing devices and methods but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmission scheduling method performed by a transmission scheduling apparatus in a wireless multi-hop network, the method comprising:
   calculating a transmission demand of each of a plurality of nodes; and
   allocating at least one time slot to each of the plurality of nodes by using the transmission demand of each of the plurality of nodes;
   wherein the allocating of at least one time slot to each of the plurality of nodes comprises: allocating one time slot starting from a node having a maximum transmission demand among candidate nodes to which the one time slot is to be allocated;
   excluding a node to which the one time slot has been allocated and a node which has a collision with the one time slot-allocated node from the candidate nodes; and adjusting the transmission demands of the nodes which have been allocated the one time slot
   when there are no more nodes to which the one time slot is to be allocated among the candidate nodes.

2. The method of claim 1, wherein the calculating comprises:
   receiving location information and information regarding connections with neighbor nodes from each of the plurality of nodes; and
   calculating a transmission demand of each node by using the location information of each node and the information regarding connections with neighbor nodes of each node.

3. The method of claim 1, wherein the allocating comprises allocating time slots starting from a node having the highest transmission demand among the plurality of nodes.

4. The method of claim 3, wherein the allocating of time slots starting from the node having the highest transmission demand comprises
   allocating the corresponding time slot to a node which does not have a collision with the time slot-allocated node.

5. The method of claim 1, wherein the allocating of at least one time slot to each of the plurality of nodes further comprises switching to another time slot and allocating the another time slot to at least one node based on the transmission demands of the plurality of nodes; and
   allocating the another time slot to at least one node among the candidate nodes which are to be allocated the another time slot.

6. The method of claim 1, wherein the allocating of at least one time slot to each of the plurality of nodes further comprises
   converting the transmission demands of the plurality of nodes into a number of guaranteed time slots which are to be guaranteed for each of the plurality of nodes at the minimum.

7. The method of claim 6, wherein the allocating of at least one time slot to each of the plurality of nodes further comprises
   repeating the allocating of the corresponding time slot while switching to yet another time slot until such time that the number of time slots allocated to each of the plurality of nodes satisfies the number of guaranteed time slots of each node.

8. The method of claim 1, wherein the adjusting comprises subtracting one time slot from the transmission demand of at least one node which has been allocated the one time slot.

9. The method of claim 1, further comprising
   shuffling the time slots by time slot unit.

10. A transmission scheduling apparatus for scheduling a plurality of nodes in a wireless multi-hop network, the apparatus comprising:
    a transmission demand calculation unit calculating a number of guaranteed time slots to be guaranteed at a minimum for each of the plurality of nodes corresponding to each of transmission demands of the plurality of nodes in the wireless multi-hop network; and
    a time slot allocation unit allocating at least one time slot to each of the plurality of nodes, wherein the allocating of at least one time slot to each of the plurality of nodes comprises:
       allocating one time slot to a node having a maximum transmission demand among candidate nodes to which the one time slot is to be allocated;
       excluding a node to which the one time slot has been allocated and a node which has a collision with the one time slot-allocated node from the candidate nodes; and
    adjusting the transmission demands of the nodes which have been allocated the one time slot when there are no more nodes to which the one time slot is to be allocated among the candidate nodes.

11. The transmission scheduling apparatus of claim 10, further comprising
    a management unit receiving location information and information regarding connections with neighbor nodes from the plurality of nodes and managing the same,
    wherein the transmission demand calculation unit calculates the location information and the information regarding the connections with neighbor nodes received from each of the plurality of nodes.

12. The transmission scheduling apparatus of claim 10, wherein the time slot allocation unit additionally allocates one time slot to a node which does not make a collision with a node which has been allocated the one time slot.

13. The transmission scheduling apparatus of claim 10, wherein when there are no more nodes which have a collision with the node to which a corresponding time slot has been allocated among the candidate nodes to which the corresponding time slot is to be allocated, the time slot allocation unit switches to another time slot.

14. The transmission scheduling apparatus of claim 10, wherein when the number of time slots allocated to the plurality of nodes satisfies the number of guaranteed time slots of the plurality of nodes, the time slot allocation unit shuffles the time slots by time slot unit.

15. The transmission scheduling apparatus of claim 10, wherein the time slot allocation unit transmits information regarding the time slots allocated to the plurality of nodes to the plurality of nodes.

16. The transmission scheduling apparatus of claim 10, wherein the transmission demand calculation unit sets a scaling factor that determines the number of guaranteed time slots of a node having a minimum value among the numbers of guaranteed time slots of the plurality of nodes, and calculates the number of guaranteed time slots of each of the plurality of nodes by multiplying the transmission demands of the plurality of nodes by the scaling factor.

* * * * *